(12) United States Patent
Fukao et al.

(10) Patent No.: US 11,745,722 B2
(45) Date of Patent: Sep. 5, 2023

(54) VEHICLE CONTROL DEVICE (71) Applicant: HONDA MOTOR CO., LTD., Tokyo (JP)

(72) Inventors: Masashi Fukao, Saitama (JP); Yuki Fujishima, Tokyo (JP); Masaya Agata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 17/681,033

(22) Filed: Feb. 25, 2022

(65) Prior Publication Data

US 2022/0306072 A1 Sep. 29, 2022

(30) Foreign Application Priority Data

Mar. 25, 2021 (JP) .................................. 2021-052253

(51) Int. Cl.
*B60W 20/10* (2016.01)
*B60W 10/06* (2006.01)
(Continued)

(52) U.S. Cl.
CPC .......... *B60W 20/10* (2013.01); *B60W 10/026* (2013.01); *B60W 10/06* (2013.01); *B60W 10/08* (2013.01); *B60W 20/40* (2013.01); *F02D 41/123* (2013.01); *B60K 6/40* (2013.01); *B60W 2710/024* (2013.01); *B60W 2710/0616* (2013.01); *B60W 2710/0666* (2013.01);
(Continued)

(58) Field of Classification Search
CPC ............. F02D 2200/0406; F02D 29/02; F02D 41/0087; F02D 41/022; F02D 41/123; B60W 10/026; B60W 10/06; B60W 10/08; B60W 20/10; B60W 2510/0233; B60W 2510/0604; B60W 2710/024
See application file for complete search history.

(56) References Cited

U.S. PATENT DOCUMENTS 5,050,717 A * 9/1991 Shibayama ........... F16H 61/143
477/64
5,637,052 A * 6/1997 Hirota ................. F16H 61/0213
477/61
(Continued)

FOREIGN PATENT DOCUMENTS

JP 2002-247708 A 8/2002
JP 2003-083104 A 3/2003

*Primary Examiner* — Carl C Staubach
(74) *Attorney, Agent, or Firm* — Paratus Law Group, PLLC (57) ABSTRACT

A vehicle control device is configured to: execute a fuel cut control for stopping fuel supply to the internal combustion engine in response to a deceleration request to the vehicle; engage the lock-up clutch and open a throttle of the vehicle during the execution of the fuel cut control; close the throttle and execute the motor assist in a case where there is an acceleration request to the vehicle while the lock-up clutch is engaged, the throttle is opened, and the fuel cut control is executed; end the fuel cut control and resume fuel supply to the internal combustion engine when an intake pressure of the internal combustion engine reaches a predetermined startable negative pressure after the throttle is closed; and disengage the lock-up clutch when the fuel supply to the internal combustion engine is resumed.

3 Claims, 3 Drawing Sheets

(51) Int. Cl.
  *B60W 10/02*      (2006.01)
  *B60W 10/08*      (2006.01)
  *B60W 20/40*      (2016.01)
  *F02D 41/12*      (2006.01)
  *B60K 6/40*       (2007.10)

(52) U.S. Cl.
  CPC . *B60W 2710/083* (2013.01); *B60W 2720/106* (2013.01); *B60Y 2200/92* (2013.01); *F02D 2200/0406* (2013.01)

(56) References Cited

U.S. PATENT DOCUMENTS

| | | | |
|---|---|---|---|
| 7,055,635 B2* | 6/2006 | Itoh | B60W 10/08 903/914 |
| 9,278,685 B2* | 3/2016 | Gibson | B60W 30/181 |
| 10,513,995 B2* | 12/2019 | Sagayama | F02N 11/08 |
| 2002/0116112 A1 | 8/2002 | Wakashiro et al. | |
| 2003/0186778 A1* | 10/2003 | Yamamoto | B60W 10/06 903/917 |
| 2005/0010353 A1 | 1/2005 | Matsubara et al. | |
| 2012/0108386 A1* | 5/2012 | Wakas | B60W 10/08 180/65.265 |
| 2022/0306075 A1* | 9/2022 | Fukao | B60W 30/20 |
| 2022/0306079 A1* | 9/2022 | Fukao | B60W 10/08 |
| 2022/0306082 A1* | 9/2022 | Fukao | F02D 41/045 |

\* cited by examiner

VEHICLE CONTROL DEVICE

CROSS-REFERENCE TO RELATED APPLICATIONS

This application is based on and claims priority under 35 USC 119 from Japanese Patent Application No. 2021-052253 filed on Mar. 25, 2021, the contents of which are incorporated herein by reference.

TECHNICAL FIELD

The present disclosure relates to a vehicle control device.

BACKGROUND

In the related art, a fuel cut control for stopping fuel supply to an internal combustion engine is executed in order to improve fuel consumption performance of a vehicle including an internal combustion engine.

JP-A-2002-247708 discloses a hybrid vehicle including an engine that can be switched between a normal operation and a cylinder deactivation operation and serves as a drive source of the vehicle and a motor that performs driving assistance of the engine in accordance with an operating state of the vehicle, and discloses a technique in which the motor performs the driving assistance of the engine at the time of transition from the cylinder deactivation operation to the normal operation. JP-A-2003-083104 discloses a technique in which a starting torque for starting an engine by a motor when the engine is returned from a deactivated-cylinder state is lower than a normal starting torque.

When a vehicle including an internal combustion engine, an electric motor coupled to the internal combustion engine, and a drive wheel coupled to the internal combustion engine and the electric motor via a power transmission device is braked (that is, at the time of decelerating the vehicle), the electric motor can perform regenerative power generation. At this time, when a loss of the internal combustion engine relative to power input from the drive wheel can be reduced, a regenerative torque input to the electric motor can be increased, and a power generation amount of the electric motor can be increased. Therefore, it is conceivable to reduce a pumping loss of the internal combustion engine and increase the regenerative torque by opening a throttle of the vehicle when a fuel cut control is executed in response to a deceleration request. In such a case, responsiveness to a subsequent acceleration request and noise and vibration (NV) characteristics of the vehicle in the related art can be improved.

The present disclosure provides a vehicle control device that can prevent the deterioration of NV characteristics of a vehicle while ensuring responsiveness of the vehicle to an acceleration request after a deceleration request.

SUMMARY

One aspect of the present disclosure relates to a vehicle control device for controlling a vehicle that includes an internal combustion engine, an electric motor coupled to the internal combustion engine, and a drive wheel coupled to the internal combustion engine and the electric motor via a power transmission device and that is configured to execute a motor assist for assisting driving of the drive wheel by power of the electric motor. The power transmission device includes a torque converter, a lock-up clutch, and a main shaft configured to output, to the drive wheel, power of at least one of the internal combustion engine and the electric motor transmitted via at least one of the torque converter and the lock-up clutch. The vehicle control device is configured to: execute a fuel cut control for stopping fuel supply to the internal combustion engine in response to a deceleration request to the vehicle; engage the lock-up clutch and open a throttle of the vehicle during the execution of the fuel cut control; close the throttle and execute the motor assist in a case where there is an acceleration request to the vehicle while the lock-up clutch is engaged, the throttle is opened, and the fuel cut control is executed; end the fuel cut control and resume fuel supply to the internal combustion engine when an intake pressure of the internal combustion engine reaches a predetermined startable negative pressure after the throttle is closed; and disengage the lock-up clutch when the fuel supply to the internal combustion engine is resumed.

According to the present disclosure, it is possible to provide a vehicle control device that can prevent the deterioration of NV characteristics of a vehicle while ensuring vehicle responsiveness to an acceleration request after a deceleration request.

BRIEF DESCRIPTION OF DRAWINGS

Exemplary embodiments of the present disclosure will be described in detail based on the following figures, wherein.

DESCRIPTION OF EMBODIMENTS

Hereinafter, an embodiment of a vehicle control device according to the present disclosure will be described in detail with reference to the drawings.

[Vehicle]

Figure 1:
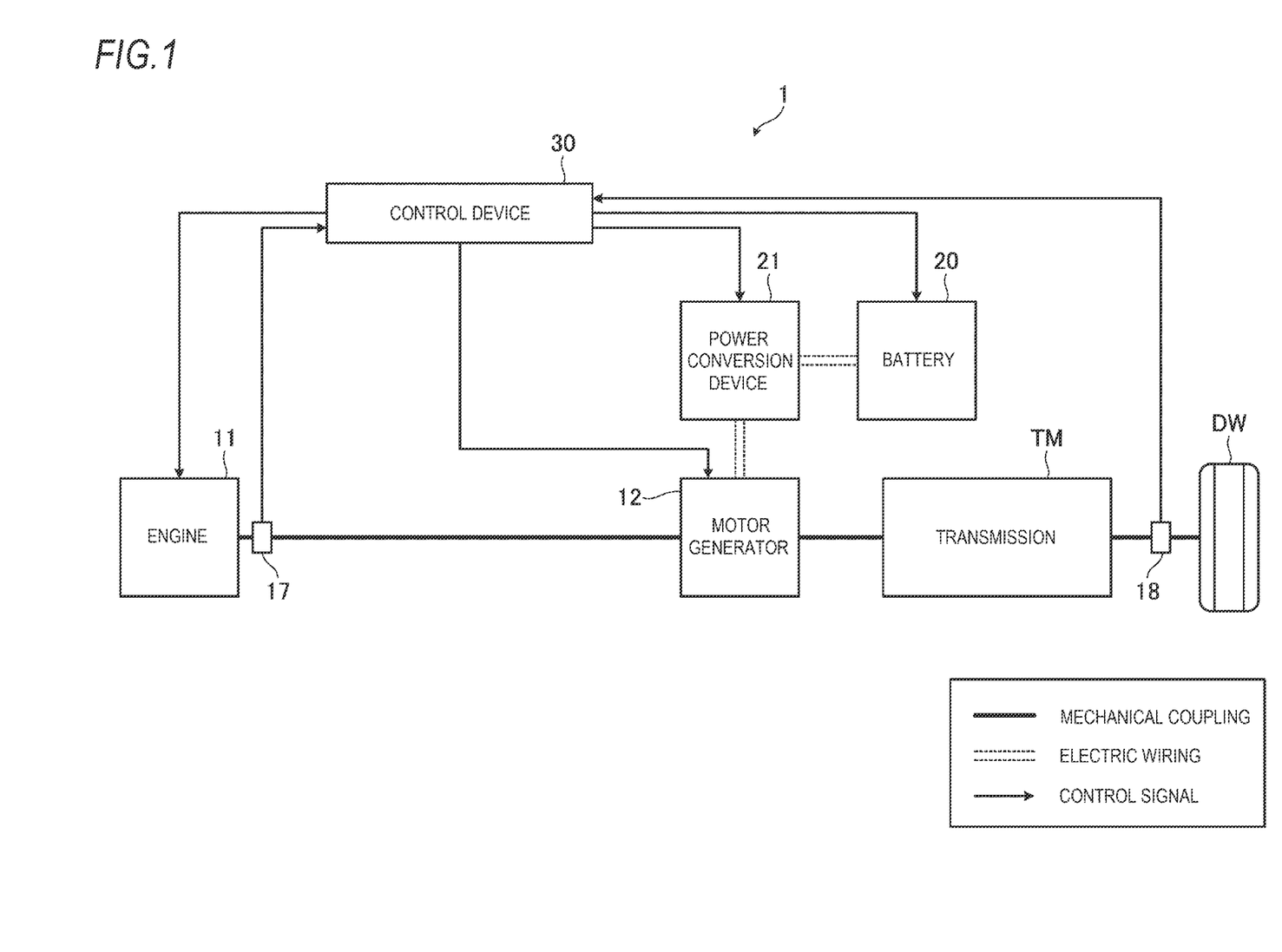
FIG. 1 is a diagram showing an example of a vehicle according to an embodiment.

As shown in FIG. 1, a vehicle 1 according to the present embodiment is a so-called hybrid electrical vehicle, and includes an engine 11 that is an example of an internal combustion engine, a motor generator 12 that is an example of an electric motor, a transmission TM that is an example of a power transmission device, a drive wheel DW, a battery 20, a power conversion device 21, and a control device 30 that controls the entire vehicle 1. The control device 30 is an example of a vehicle control device according to the present disclosure. In FIG. 1, a thick solid line indicates mechanical coupling, double broken lines indicate electric wiring, and a solid arrow indicates a control signal.

The engine 11 is, for example, a so-called cylinder deactivation engine configured to be switchable between an all-cylinder operation in which all cylinders can be operated and a deactivated-cylinder operation in which some cylinders can be deactivated. For example, the engine 11 is a V-type six-cylinder engine including a variable valve timing mechanism (not shown), and is configured such that three cylinders of one bank can be deactivated by the variable valve timing mechanism. That is, in the engine 11, a six-cylinder operation using six cylinders of both banks is performed during an all-cylinder operation, and a three-cylinder operation using only three cylinders of one bank is performed during a deactivated-cylinder operation. For example, the engine 11 is configured such that a valve opening period, a valve opening and closing timing, a lift amount, and the like of each intake valve can be changed by the variable valve timing mechanism.

Figure 2:
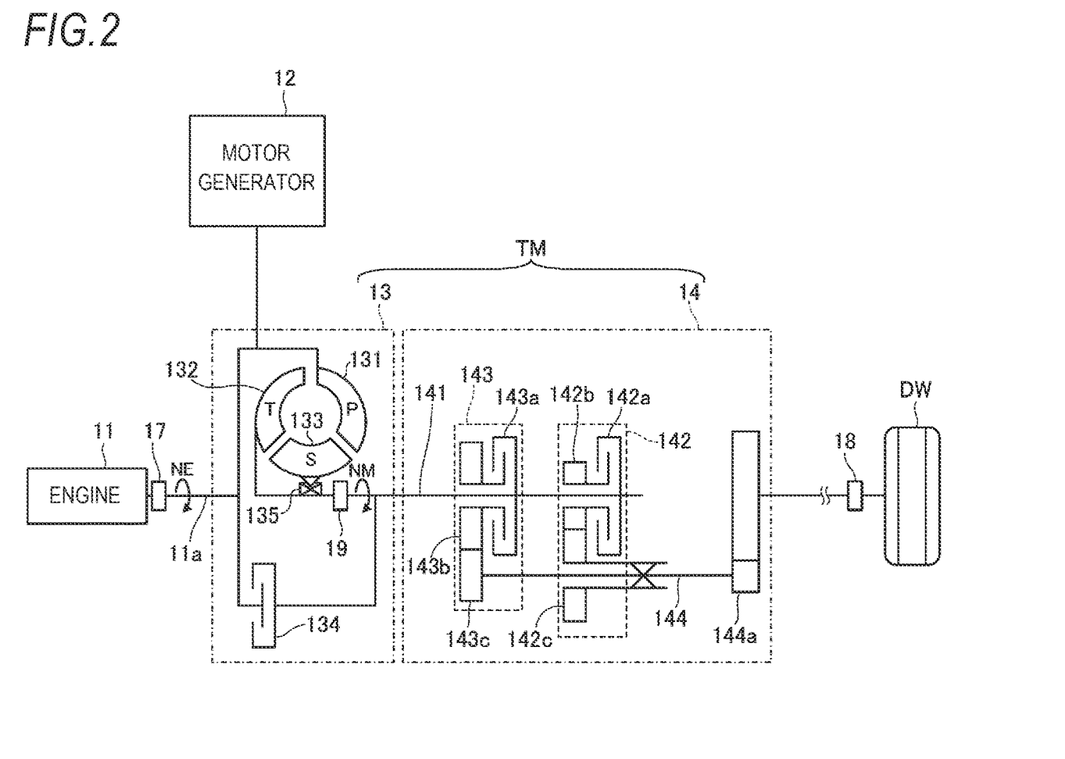
FIG. 2 is a diagram showing an example of a transmission provided in the vehicle according to the embodiment.

The engine 11 outputs mechanical energy (power) generated by burning supplied fuel (for example, gasoline) by rotationally driving a crankshaft 11a (see FIG. 2). Specifically, the engine 11 includes an injector (not shown). The injector is controlled by the control device 30 using, for example, a pulse width modulation (PWM) control, and supplies fuel to the engine 11. Power output from the engine 11 by a fuel supply is transmitted to the drive wheel DW via the transmission TM that is mechanically coupled to the engine 11, and the power is used for traveling of the vehicle 1.

The engine 11 is also mechanically coupled to the motor generator 12. The motor generator 12 is, for example, a three-phase AC motor, and functions as an electric motor that outputs power by being supplied with electric power. Specifically, a rotor (not shown) of the motor generator 12 is coupled to the crankshaft 11a of the engine 11. Therefore, a crank end torque is the sum of a torque output from the engine 11 (hereinafter, also referred to as an engine torque) and a torque output from the motor generator 12 (hereinafter, also referred to as a motor torque). The crank end torque is a torque at a shaft end of the crankshaft 11a of a power plant torque output from a power plant including the engine 11 and the motor generator 12. In the following description, a positive (plus) motor torque is also referred to as a power running torque, and a negative (minus) motor torque is also referred to as a regenerative torque.

Since the engine 11 and the motor generator 12 are mechanically coupled to each other, the vehicle 1 can perform motor assist in which driving of the drive wheel DW (that is, traveling of the vehicle 1) using the output of the engine 11 is assisted by an output of the motor generator 12.

Since the engine 11 and the motor generator 12 are mechanically coupled to each other, the motor generator 12 can be rotationally driven by the output of the engine 11, or the engine 11 can be rotationally driven by the output of the motor generator 12.

The motor generator 12 is electrically connected to the battery 20 via the power conversion device 21. The battery 20 is, for example, a battery that includes a plurality of electric power storage cells connected in series and can output a predetermined voltage (for example, 50 to 200 [V]). The electric power storage cells of the battery 20 may use a lithium ion battery, a nickel-metal hydride battery, or the like.

The power conversion device 21 is a device that includes an inverter (not shown), an AC-DC converter (not shown), and the like. The power conversion device 21 is controlled by the control device 30, and performs electric power conversion. For example, the power conversion device 21 converts DC electric power supplied from the battery 20 into three-phase AC electric power and supplies the three-phase AC electric power to the motor generator 12, or converts three-phase AC electric power supplied from the motor generator 12 into DC electric power and supplies the DC electric power to the battery 20. The motor generator 12 is supplied with electric power from the battery 20 via the electric power conversion device 21, so that the motor generator 12 can perform the motor assist described above.

The motor generator 12 also functions as a power generator that generates electric power by being rotationally driven. The motor generator 12 can be rotationally driven by the output of the engine 11 as described above, and can also be rotationally driven by power input from the drive wheel DW side accompanying with braking or the like of the vehicle 1. The electric power generated by the motor generator 12 is supplied to the battery 20 via the power conversion device 21, and is used to charge the battery 20.

The transmission TM is, for example, a multistage transmission having a plurality of shift stages (for example, seven shift stages), and is provided in a power transmission path from the engine 11 to the drive wheel DW. Specifically, the transmission TM includes a torque converter 13 and a gear box 14 as shown in FIG. 2.

The torque converter 13 includes a pump impeller 131, a turbine runner 132, a stator 133, and a lock-up clutch 134. The pump impeller 131 is mechanically coupled to the engine 11 and the motor generator 12 (specifically, the crankshaft 11a), and rotates integrally with the engine 11 and the motor generator 12 when the engine 11 and the motor generator 12 are rotationally driven. The turbine runner 132 has a hydraulic oil inlet located close to a hydraulic oil outlet of the pump impeller 131. The turbine runner 132 is mechanically coupled to an input shaft 141 of the gear box 14, and rotates integrally with the input shaft 141. The stator 133 is interposed between the turbine runner 132 and the pump impeller 131, and deflects a flow of hydraulic oil returning from the turbine runner 132 to the pump impeller 131. The stator 133 is supported by a housing (not shown) or the like of the torque converter 13 via a one-way clutch 135. The torque converter 13 can transmit power (rotation power) from the pump impeller 131 to the turbine runner 132 via the hydraulic oil by circulating the hydraulic oil in a circulation path formed between the pump impeller 131 and the turbine runner 132.

The lock-up clutch 134 is a clutch capable of mechanically connecting the engine 11 to and disconnecting the engine 11 from the input shaft 141 of the gearbox 14. An output of the engine 11 can be directly transmitted to the input shaft 141 of the gearbox 14 by bringing the lock-up clutch 134 into an engaged state. That is, while the lock-up clutch 134 is in the engaged state, the crankshaft 11a of the engine 11 and the input shaft 141 of the gear box 14 rotate integrally.

The gearbox 14 includes the input shaft 141 to which the output of the engine 11 or the motor generator 12 is transmitted via at least one of the torque converter 13 and the lock-up clutch 134, a plurality of transmission mechanisms 142 and 143 capable of shifting power transmitted to the input shaft 141, and an output member 144 including an output gear 144a that outputs the power shifted by any one of the plurality of transmission mechanisms to the drive wheel DW. The input shaft 141 is an example of a main shaft.

The plurality of transmission mechanisms provided in the gearbox 14 include a first transmission mechanism 142 and a second transmission mechanism 143. The first transmission mechanism 142 includes a first transmission clutch 142a, a first drive gear 142b that rotates integrally with the input shaft 141 while the first transmission clutch 142a is in an engaged state, and a first driven gear 142c that rotates integrally with the output member 144. The second transmission mechanism 143 includes a second transmission clutch 143a, a second drive gear 143b that rotates integrally with the input shaft 141 while the second transmission clutch 143a is in an engaged state, and a second driven gear 143c that rotates integrally with the output member 144.

Although FIG. 2 only shows the first transmission mechanism 142 and the second transmission mechanism 143 as the transmission mechanisms provided in the gear box 14, the gear box 14 also includes, for example, transmission mechanisms (not shown) other than the first transmission mechanism 142 and the second transmission mechanism 143.

Whether each clutch provided in the transmission TM such as the lock-up clutch 134, the first transmission clutch 142a, and the second transmission clutch 143a (hereinafter, also simply referred to as a clutch of the transmission TM) is brought into an engaged state or a disengaged state is controlled by the control device 30.

Returning to FIG. 1, the control device 30 is a device that controls the engine 11, the transmission TM, the power conversion device 21, and the like. Further, the control device 30 can also control the motor generator 12 via controlling the power conversion device 21. The control device 30 may directly control the motor generator 12, or may control an input and an output of the battery 20. The control device 30 is implemented by, for example, an electronic control unit (ECU) including a processor that executes various calculations, a storage device that stores various types of information, an input and output device that controls data input and output between an inner side and an outer side of the control device 30, and the like. The control device 30 may be implemented by a single ECU, or may be implemented by cooperation of a plurality of ECUs.

Various sensors are connected to the control device 30, and the control device 30 controls the engine 11, the transmission TM, the power conversion device 21 (that is, the motor generator 12), and the like based on information input from the various sensors. Examples of sensors connected to the control device 30 include an engine rotation speed sensor 17 that detects a rotation speed of the engine 11 (the crankshaft 11a) (hereinafter, also referred to as an engine rotation speed, see NE in FIG. 2), a vehicle speed sensor 18 that detects a traveling speed of the vehicle 1 (hereinafter, also referred to as a vehicle speed), and a main shaft rotation speed sensor 19 (see FIG. 2) that detects a rotation speed of the input shaft 141 (hereinafter, also referred to as a main shaft rotation speed. see NM in FIG. 2).

Further, examples of the sensors connected to the control device 30 include an AP sensor that detects an operation amount (hereinafter, referred to as an AP opening degree) on an accelerator pedal of the vehicle 1, a brake sensor that detects an operation amount on a brake pedal of the vehicle 1, a gear position sensor that detects a shift stage of the transmission TM, a battery sensor that detects an output or a temperature of the battery 20, and an intake pressure sensor that detects an intake pressure of the engine 11 (all of the sensors described above are not shown). In addition, an atmospheric pressure sensor (not shown) that detects an atmospheric pressure may be connected to the control device 30.

For example, the control device 30 derives a target torque for a crank end torque (hereinafter, also referred to as a crank end required torque) that is the sum of an engine torque and a motor torque, based on a traveling state of the vehicle 1. For example, the control device 30 derives the crank end required torque by referring to the vehicle speed detected by the vehicle speed sensor 18, the AP opening degree detected by the AP sensor, and a map that defines the crank end required torque required for traveling of the vehicle 1 in accordance with the vehicle speed and the AP opening degree. For example, the map is stored in advance in the storage device of the control device 30. The control device 30 controls the engine torque and the motor torque so that the crank end torque reaches the crank end required torque.

The control device 30 switches an operation state of the engine 11 between the all-cylinder operation and the deactivated-cylinder operation based on the crank end required torque. Specifically, the control device 30 controls the engine 11 in the deactivated-cylinder operation when the crank end required torque is relatively small, and controls the engine 11 in the all-cylinder operation when the crank end required torque becomes large to some extent. That is, the control device 30 improves fuel consumption performance of the vehicle 1 by operating the engine 11 in the deactivated-cylinder operation when the crank end required torque is small, and ensures an appropriate crank end torque according to a traveling state of the vehicle 1 by operating the engine 11 in the all-cylinder operation when the crank end required torque is large.

The control device 30 executes a fuel cut control for stopping fuel supply to the engine 11 in response to a deceleration request to the vehicle 1 that is traveling. The deceleration request is, for example, a brake on request for operating (for example, depressing) a brake pedal of the vehicle 1, an accelerator off request for releasing an operation on an accelerator pedal of the vehicle 1, or the like.

In a case where there is an acceleration request to the vehicle 1 when the fuel supply to the engine 11 is stopped by the fuel cut control, the control device 30 ends the fuel cut control and resumes the fuel supply to the engine 11. The acceleration request is, for example, a brake off request for releasing an operation on the brake pedal of the vehicle 1, an accelerator on request for operating the accelerator pedal, or the like.

In the vehicle 1, when the vehicle 1 is decelerated in response to a deceleration request, that is, when the control device 30 executes the fuel cut control, the motor generator 12 can generate electric power (generate regenerative electric power) by the power input from the drive wheel DW. At this time, an amount of electric power generated by the motor generator 12 (hereinafter, also simply referred to as an electric power generation amount) per unit time increases as a regenerative torque that is a torque input to the motor generator 12 increases, and the battery 20 can be charged in a short time.

As shown in FIGS. 1 and 2, when the engine 11 and the motor generator 12 are directly coupled to each other, it is conceivable to reduce the loss of the engine 11 relative to the power input from the drive wheel DW as a method of increasing the regenerative torque at the time of decelerating the vehicle 1. Therefore, the control device 30 opens a throttle valve (not shown, hereinafter, also simply referred to as a throttle) of the vehicle 1 at the time of decelerating the vehicle 1, that is, at the time of executing the fuel cut control. Accordingly, a pumping loss of the engine 11 at the time of decelerating the vehicle 1 can be reduced, and the regenerative torque can be increased.

Further, the control device 30 deactivates some cylinders of the engine 11 at the time of decelerating the vehicle 1 in the present embodiment. Specifically, the control device 30 fully closes intake and exhaust valves of three cylinders of one bank at the time of decelerating the vehicle 1. As a result, the pumping loss of the engine 11 at the time of decelerating the vehicle 1 can be further reduced, and the regenerative torque can be increased.

In a case where the throttle is opened during the execution of the fuel cut control, it is required to temporarily close the throttle to adjust an intake air amount of the engine 11 when the fuel supply to the engine 11 is resumed in response to the acceleration request. This is because, when the fuel supply to the engine 11 is resumed in a state in which the intake air amount is excessive (that is, in a state in which the intake pressure of the engine 11 is high), an excessive engine torque is output from the engine 11. As a result, the engine rotation speed overshoots, and the NV characteristics of the vehicle 1 deteriorate, or the vehicle 1 jumps out against the intention of a driver.

Therefore, in a case where the throttle is opened during the execution of the fuel cut control, a certain period of time is required for adjusting the intake air amount from a time when the acceleration request is issued to a time when the fuel supply to the engine 11 is resumed. When neither one of the above is performed during this period, the responsiveness of the vehicle 1 to the acceleration request is lowered.

In a case where there is an acceleration request to the vehicle 1 when the lock-up clutch 134 is engaged and the throttle of the vehicle 1 is opened during the execution of the fuel cut control, the control device 30 closes the throttle and executes the motor assist. Specifically, the control device 30 executes the motor assist so as to compensate for the crank end required torque by the motor torque. The crank end required torque is increased in response to the acceleration request. Accordingly, it is possible to ensure an appropriate crank end torque in accordance with a traveling state of the vehicle 1, and it is possible to prevent a decrease in the responsiveness of the vehicle 1 to the acceleration request after the deceleration request.

Then, when the intake pressure of the engine 11 reaches a predetermined startable negative pressure (that is, an appropriate intake air amount) after the throttle is closed, the control device 30 ends the fuel cut control and resumes the fuel supply to the engine 11. As a result, the engine 11 can be started while preventing the engine rotation speed from overshooting.

When the engine 11 is started by resuming the fuel supply to the engine 11, the engine torque output from the engine 11 rapidly increases as compared with that before the engine 11 is started. When the engine torque output from the engine 11 is small to some extent as the fuel supply to the engine 11 is resumed, the rapid increase of the crank end torque can be prevented by controlling a regenerative torque of the motor generator 12, and it is also conceivable that the engine torque that cannot be absorbed by the regenerative torque of the motor generator 12 is output, and the crank end torque rapidly increases. In a case where the lock-up clutch 134 is in the engaged state when the crank end torque greatly fluctuates in this manner, the torque fluctuation is transmitted to the drive wheel DW via the lock-up clutch 134, and there may be a shock that may cause a driver to feel uncomfortable. The occurrence of such a shock leads to the deterioration of the NV characteristics of the vehicle 1.

The control device 30 disengages the lock-up clutch 134 when resuming the fuel supply to the engine 11. As a result, even when the engine torque output from the engine 11 rapidly increases as the fuel supply to the engine 11 is resumed, it is possible to prevent the torque transmitted to the drive wheel DW from rapidly changing. Therefore, it is possible to prevent the occurrence of a shock that may cause a driver to feel uncomfortable and prevent the deterioration of the NV characteristics of the vehicle 1.

As described above, in a case where there is an acceleration request when the lock-up clutch 134 is engaged and the throttle is opened during the execution of the fuel cut control in response to a deceleration request, the control device 30 closes the throttle and executes the motor assist. As a result, a loss (a pumping loss) of the engine 11 when the vehicle 1 is decelerated in response to the deceleration request can be reduced, an electric power generation amount of the motor generator 12 can be increased, and the responsiveness of the vehicle 1 to the acceleration request after the deceleration request can be ensured.

Then, when the intake pressure of the engine 11 reaches the startable negative pressure after the throttle is closed in response to the acceleration request, the control device 30 ends the fuel cut control, resumes the fuel supply to the engine 11, and disengages the lock-up clutch 134 when resuming the fuel supply. As a result, it is possible to start the engine 11 while preventing the engine rotation speed from overshooting, it is possible to reduce the shock generated accompanying with the start of the engine 11, and it is possible to prevent the deterioration of the NV characteristics of the vehicle 1. Hereinafter, an example of a specific control executed by the control device 30 will be described with reference to FIG. 3.

[Example of Specific Control Executed by Control Device]

Figure 3:
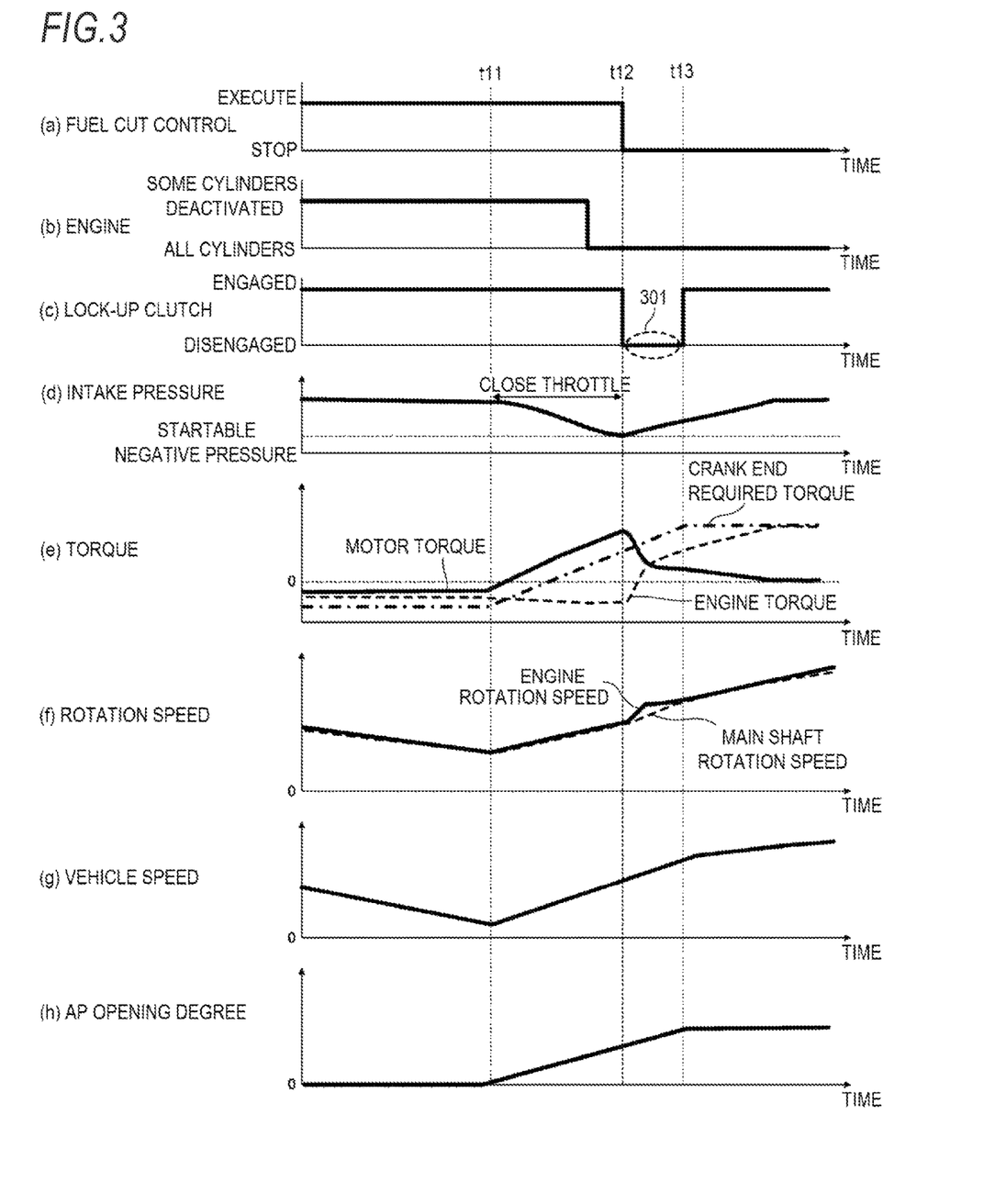
FIG. 3 is a diagram showing a specific example of a control executed by a control device according to the embodiment.

FIG. 3 shows a relationship among times of (a) an execution state of the fuel cut control, (b) a state of the engine 11 (whether some cylinders are deactivated), (c) a state of the lock-up clutch 134, (d) an intake pressure of the engine 11, (e) various torques, (f) various rotation speeds, (g) a vehicle speed, and (h) an AP opening degree.

FIG. 3 shows an example of a case where there is an acceleration request when the vehicle 1 is decelerated in response to a deceleration request, and then the control device 30 accelerates the vehicle 1 in response to an acceleration request. In the example shown in FIG. 3, it is assumed that when the vehicle 1 is decelerated (that is, in a period up to a time t11 to be described later), the fuel cut control is executed by the control device 30, the lock-up clutch 134 is engaged, and the throttle of the vehicle 1 is opened. In this manner, the lock-up clutch 134 is engaged at the time of decelerating the vehicle 1, since it is possible to efficiently transmit power from the drive wheel DW to the motor generator 12, it is possible to increase the regenerative torque and increase the electric power generation amount of the motor generator 12, as compared with a case where the lock-up clutch 134 is released.

At the time t11 shown in FIG. 3, it is assumed that a driver steps on the accelerator pedal and the AP opening degree is increased. When there is such an acceleration request, the control device 30 executes the motor assist so as to compensate for the crank end required torque by the motor torque. The crank end required torque is increased as the AP opening degree increases. As a result, the motor torque output from the motor generator 12 is increased. When there is an acceleration request, the control device 30 gradually closes the throttle in order to resume the fuel supply to the engine 11. As a result, the intake pressure of the engine 11 is reduced.

Then, at a time t12 after the time t11, when the intake pressure of the engine 11 reaches a predetermined startable negative pressure (that is, an appropriate intake air amount), the control device 30 disengages the lock-up clutch 134 (see a portion surrounded by a broken line denoted by a reference numeral 301 in FIG. 3), ends the fuel cut control, and resumes the fuel supply to the engine 11. As a result, the control device 30 appropriately starts the engine 11, reduces a shock generated accompanying with the starting of the engine 11, and prevents the deterioration of the NV characteristics of the vehicle 1.

As shown in FIG. 3, the control device 30 may bring the engine 11 into an all-cylinder operable state before resuming the fuel supply to the engine 11. As a result, it is possible to quickly increase the engine torque output from the engine 11 accompanying with the resuming of the fuel supply to the engine 11. The control device 30 can switch the engine 11 to the all-cylinder operable state while reducing a time for reducing a pressure to an appropriate intake pressure of the engine 11 by setting the engine 11 to the all-cylinder operable state in accordance with the closing of the throttle.

The control device 30 may determine whether the engine 11 is brought into the all-cylinder operable state based on the crank end required torque before resuming the fuel supply to the engine 11, and may bring the engine 11 to the all-cylinder operable state based on the determination result. That is, the control device 30 may switch the engine 11 to the all-cylinder operable state when the crank end required torque before resuming the fuel supply to the engine 11 is large to some extent.

As shown in FIG. 3, after the fuel supply to the engine 11 is resumed (that is, after the engine 11 is started), the control device 30 executes the motor assist until the engine torque output from the engine 11 reaches the crank end required torque based on a traveling state of the vehicle 1. As a result, even when the engine 11 does not output a sufficient engine torque immediately after the fuel supply to the engine 11 is resumed, it is possible to ensure an appropriate crank end torque according to a traveling state of the vehicle 1 by the motor torque, and it is possible to prevent the occurrence of hesitation (so-called slowness of the vehicle 1) due to the lack of the crank end torque.

Then, as shown in FIG. 3, the control device 30 reduces the motor torque in accordance with the increase in the engine torque, and ends the motor assist when the engine torque reaches the crank end required torque. As a result, when it is possible to ensure an appropriate crank end torque in accordance with a traveling state of the vehicle 1 by the engine torque, the control device 30 ends the motor assist, and thus power consumption by the motor generator 12 can be reduced.

The control device 30 engages the lock-up clutch 134 at a time t13 when the AP opening degree is constant (that is, when there is no acceleration request to the vehicle 1) after the fuel supply to the engine 11 is resumed. As a result, it is possible to reduce a shock that occurs when the lock-up clutch 134 is engaged, and it is possible to prevent the deterioration of the NV characteristics of the vehicle 1.

As described above, the control device 30 according to the present embodiment can prevent the deterioration of the NV characteristics of the vehicle 1 while ensuring the responsiveness of the vehicle 1 to an acceleration request after a deceleration request.

Although the embodiment of the present invention has been described above, the present invention is not limited to the embodiment described above, and modifications, improvements, and the like can be made as appropriate.

For example, although an example has been described in the embodiment described above in which the power transmission device according to the present invention is the transmission TM that is a multistage transmission having a plurality of shift stages, the present invention is not limited thereto. The power transmission device may be a continuously variable transmission or may not include a transmission mechanism. Although an example has been described in the embodiment described above in which the engine 11 is a cylinder deactivation engine, the engine 11 may not be a cylinder deactivation engine.

At least the following matters are described in the present specification. Although corresponding components or the like in the embodiment described above are shown in parentheses, the present invention is not limited thereto.

(1) A vehicle control device (the control device 30) for controlling a vehicle (the vehicle 1) that includes an internal combustion engine (the engine 11), an electric motor (the motor generator 12) coupled to the internal combustion engine, and a drive w % heel (the drive wheel DW) coupled to the internal combustion engine and the electric motor via a power transmission device (the transmission TM) and that can execute a motor assist for assisting driving of the drive wheel by power of the electric motor, in which the power transmission device includes a torque converter (the torque converter 13), a lock-up clutch (the lock-up clutch 134), and a main shaft (the input shaft 141) that can output, to the drive wheel, power of at least one of the internal combustion engine and the electric motor transmitted via at least one of the torque converter and the lock-up clutch, the vehicle control device is configured to:

execute a fuel cut control for stopping fuel supply to the internal combustion engine in response to a deceleration request to the vehicle:

engage the lock-up clutch and open a throttle of the vehicle during the execution of the fuel cut control;

close the throttle and execute the motor assist in a case where there is an acceleration request to the vehicle while the lock-up clutch is engaged, the throttle is opened, and the fuel cut control is executed:

end the fuel cut control and resume fuel supply to the internal combustion engine when an intake pressure of the internal combustion engine reaches a predetermined startable negative pressure after the throttle is closed; and disengage the lock-up clutch when the fuel supply to the internal combustion engine is resumed.

According to (1), it is possible to prevent the deterioration of NV characteristics of the vehicle while ensuring responsiveness to the acceleration request after the deceleration request.

(2) The vehicle control device according to (1), in which the vehicle control device is configured to control an output of the internal combustion engine and an output of the electric motor based on a target torque for a crank end torque that is a torque at a shaft end of a crankshaft of a power plant torque output from a power plant including the internal combustion engine and the electric motor, and the vehicle control device is configured to execute the motor assist so as to compensate for the target torque that is increased in response to the acceleration request by a motor torque output from the electric motor.

According to (2), it is possible to ensure an appropriate crank end torque in accordance with a traveling state of the vehicle, and it is possible to prevent a decrease in the responsiveness of the vehicle to the acceleration request after the deceleration request.

(3) The vehicle control device according to (1) or (2), in which the vehicle control device engages the lock-up clutch in a case where there is no acceleration request after the lock-up clutch is disengaged accompanying with the resuming of the fuel supply to the internal combustion engine.

According to (3), it is possible to reduce a shock that occurs when the lock-up clutch is engaged, and it is possible to prevent the deterioration of the NV characteristics of the vehicle.

The invention claimed is:

1. A vehicle control device for controlling a vehicle that includes an internal combustion engine, an electric motor coupled to the internal combustion engine, and a drive wheel coupled to the internal combustion engine and the electric motor via a power transmission device and that is configured to execute a motor assist for assisting driving of the drive wheel by power of the electric motor,     wherein the power transmission device includes a torque converter, a lock-up clutch, and a main shaft configured to output, to the drive wheel, power of at least one of the internal combustion engine and the electric motor transmitted via at least one of the torque converter and the lock-up clutch,     the vehicle control device is configured to:

execute a fuel cut control for stopping fuel supply to the internal combustion engine in response to a deceleration request to the vehicle;

engage the lock-up clutch and open a throttle of the vehicle during the execution of the fuel cut control;

close the throttle and execute the motor assist in a case where there is an acceleration request to the vehicle while the lock-up clutch is engaged, the throttle is opened, and the fuel cut control is executed;

end the fuel cut control and resume fuel supply to the internal combustion engine when an intake pressure of the internal combustion engine reaches a predetermined startable negative pressure after the throttle is closed; and         disengage the lock-up clutch when the fuel supply to the internal combustion engine is resumed.

2. The vehicle control device according to claim 1, wherein the vehicle control device is configured to control an output of the internal combustion engine and an output of the electric motor based on a target torque for a crank end torque that is a torque at a shaft end of a crankshaft of a power plant torque output from a power plant including the internal combustion engine and the electric motor, and the vehicle control device is configured to execute the motor assist so as to compensate for the target torque that is increased in response to the acceleration request by a motor torque output from the electric motor.

3. The vehicle control device according to claim 1, the vehicle control device engages the lock-up clutch in a case where there is no acceleration request after the lock-up clutch is disengaged accompanying with the resuming of the fuel supply to the internal combustion engine.

* * * * *